United States Patent
Kyne et al.

(10) Patent No.: US 6,615,237 B1
(45) Date of Patent: Sep. 2, 2003

(54) AUTOMATIC SEARCHING FOR DATA IN A NETWORK

(75) Inventors: Fajen M. Kyne, Seattle, WA (US); Theodore L. Michel, Redmond, WA (US); Ray Sun, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/498,055

(22) Filed: Feb. 4, 2000

(51) Int. Cl.$^7$ .............................................. G06F 15/16
(52) U.S. Cl. ...................... 709/203; 709/219
(58) Field of Search ............................... 709/200, 203, 709/223, 226, 225, 229; 711/111, 122; 707/3, 5, 10

(56) References Cited

U.S. PATENT DOCUMENTS

| | | | | |
|---|---|---|---|---|
| 4,774,655 A | * | 9/1988 | Kollin et al. | 707/4 |
| 5,511,208 A | * | 4/1996 | Boyles et al. | 709/223 |
| 5,659,732 A | * | 8/1997 | Kirsch | 707/5 |
| 5,706,507 A | * | 1/1998 | Schloss | 707/104.1 |
| 5,768,578 A | * | 6/1998 | Kirk et al. | 707/100 |
| 5,802,299 A | * | 9/1998 | Logan et al. | 709/218 |
| 5,907,680 A | * | 5/1999 | Nielsen | 709/228 |
| 5,920,854 A | * | 7/1999 | Kirsch et al. | 707/3 |
| 6,009,459 A | * | 12/1999 | Belfiore et al. | 709/203 |
| 6,058,423 A | * | 5/2000 | Factor | 709/226 |
| 6,311,216 B1 | * | 10/2001 | Smith et al. | 709/226 |
| 6,338,082 B1 | * | 1/2002 | Schneider | 709/203 |
| 6,453,350 B1 | * | 9/2002 | Factor | 709/226 |

* cited by examiner

*Primary Examiner*—Krisna Lim
*Assistant Examiner*—Kimberly Flynn
(74) *Attorney, Agent, or Firm*—Lee & Hayes, PLLC (57) ABSTRACT

A system reads a text string from an address entry location of a web browser and determines whether the text string identifies a web page. If the text string identifies a web page, then the identified web page is retrieved. If the text string does not identify a web page, then the system identifies multiple web pages associated with the text string and identifies a best web page from the multiple web pages associated with the text string. The best web page is displayed in a first pane and at least a portion of the addresses associated with the multiple web pages is displayed in a second pane. The system also determines whether the text string to identifies a resource on a local network. An attempt is made to modify the text string to identify a web page if the text string does not already identify a web page. The best web page can selected from a web directory search, a web page search, or a combination of both.

32 Claims, 8 Drawing Sheets

AUTOMATIC SEARCHING FOR DATA IN A NETWORK

TECHNICAL FIELD

The present invention relates to computer systems and, more particularly, to the automatic searching for data in a network, such as a public network.

BACKGROUND

The use of networks, such as the Internet, is growing in popularity. Networks provide access to data on a wide range of topics and provide an environment that supports electronic commerce (e-commerce). Additionally, networks allow the exchange of data and other information between users, and support various other online activities.

Typically, a user accesses the Internet using a web browser application running on a client computer. The web browser application allows the client computer to communicate with various servers (also referred to as web servers) coupled to the Internet. In a typical situation, the user of the client computer sends a request to a particular web server by entering the specific address of the web server into an address entry portion of a web browser, such as an address box. An address box may also be referred to as an address bar, an address-entry portion of a web browser, or an address-entry location of a web browser. The specific address of the web server is also referred to as a uniform resource locator (URL). For example, the URL "http:H/www.microsoft.com" identifies a web site administered by Microsoft Corporation of Redmond, Wash. When accessing this web site, a particular web page (often referred to as the "home page") is displayed to the user via the web browser application.

The above procedure is useful when the user knows the web address of the web site they want to visit, or the specific web page they want to view. If the user enters an incorrect address, then either an incorrect web page is displayed or an error message is displayed on the web browser indicating that the address entered is invalid. If the user does not know the specific web address of the desired web site or web page, then the user typically uses a "search engine" to locate one or more web pages that are likely to contain the information the user is seeking. Typically, a search engine is invoked by entering a search command or search keywords into a search box of a web browser. The search box is separate from the address box used to enter URLs. Thus, if a user does not enter a valid address in an address box, the user may be required to enter similar address data twice—once in the address box and again in the search box. This double-entry of the same data is tedious and frustrating to a user trying to access information from a web page.

Certain web browsers attempt to convert a text entry into a valid web address by adding, for example, "http://", "www.", or ".com" where necessary to generate a complete URL. However, this URL may not necessarily represent what the user desired. For example, modifying a cartoon character name to be a complete URL might result in retrieving a web page that is inappropriate for children (e.g., a web site containing adult-oriented subject matter).

The system described herein addresses these and other problems by automatically searching for a web page based on information entered in an address box of a web browser and automatically modifying a web page address in certain situations.

SUMMARY

The system and methods described herein reduce the amount of data a user must enter into a web browser to access a desired web page. In particular, the user is not required to re-enter similar address data if the data entered in the address box is not a valid address.

A particular embodiment receives a text string in an address entry portion of a web browser. The embodiment identifies multiple web pages, each having an associated address, associated with the text string. A best web page is selected from the multiple web pages associated with the text string. The best web page is displayed in a first pane and at least a portion of the addresses associated with the multiple web pages is displayed in a second pane.

In one embodiment, the best web page is selected from a web directory search.

In another embodiment, the best web page is selected from a web page search.

In a particular embodiment, a request is received to display a web page associated with an address displayed in the second pane. In response to the request, the requested web page is displayed in the first pane. In this embodiment, the web page previously displayed in the first pane is replaced by the requested web page.

DETAILED DESCRIPTION

The system and methods described herein automatically search for data (e.g., web pages, data files, etc.) in a network such as the Internet. In response to a user input in the address box of a web browser, a search is automatically initiated if the user input to the address box does not identify a valid address.

This provides faster identification of web pages and provides an easier interface for the user because they are not required to re-enter the text string from the address box into a search box if the address box cannot identify a web page associated with the text string. If the user fails to enter a valid address in the address box of the web browser, the automatic search feature identifies multiple web pages that are likely to be of interest to the user, and retrieves and displays the web page that is most likely to be of interest to the user. This further is advantageous because the user is presented with two different results based on a single text string: 1) the best web page is displayed to the user along with 2) a list of alternate web pages to choose from.

Although particular examples are discussed herein as they relate to searching for web pages on the Internet, the teachings of the present invention can be applied to any type of resource locator that searches for data or other resources in response to a user input. For example, a user may search a local area network for a particular resource or search their own computer system for a particular resource (such as a data file or an application program). Thus, the invention is not limited to the use of a web browser to search for resources on a public network.

Figure 1:
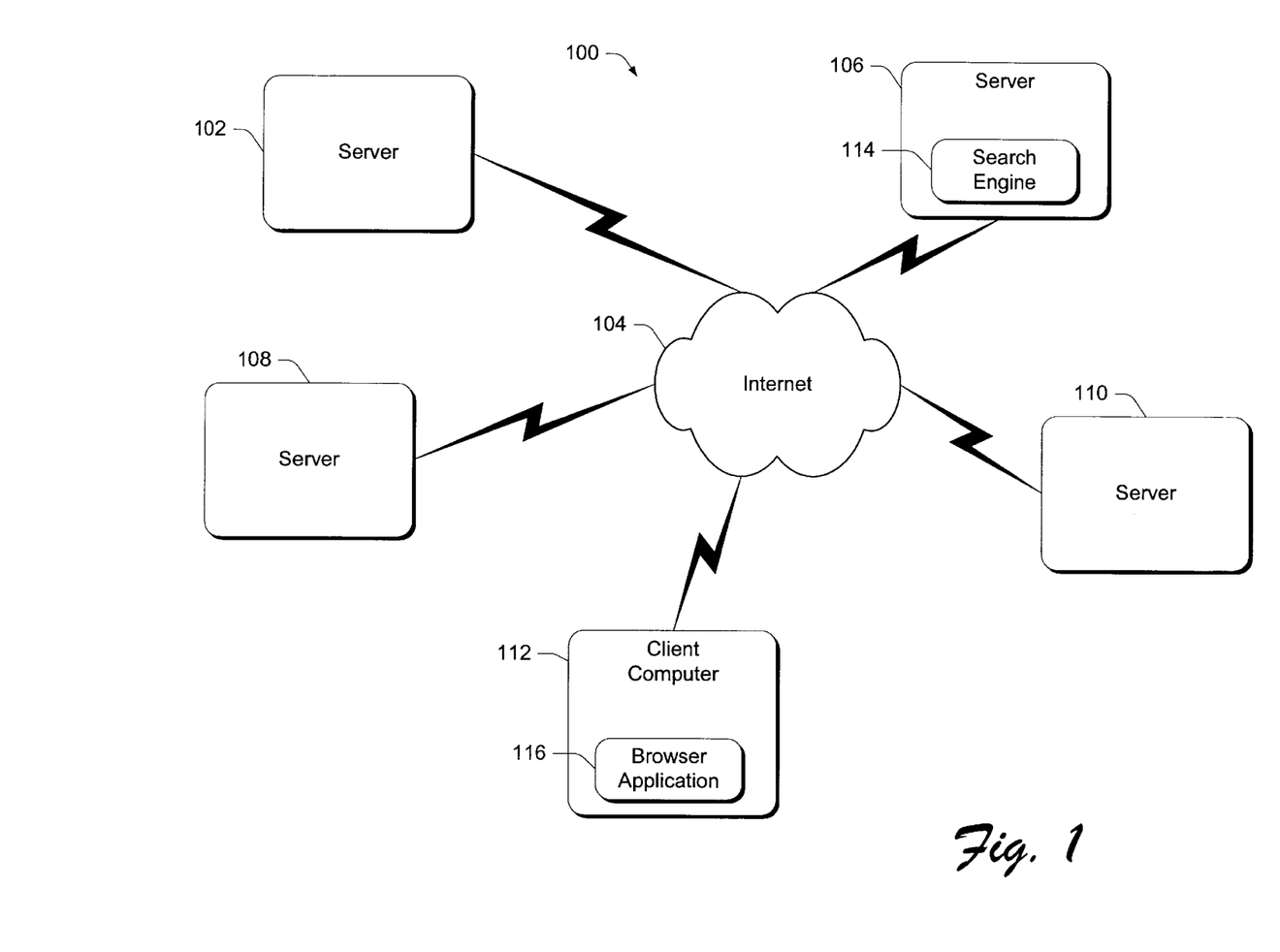
FIG. 1 illustrates an exemplary network environment in which multiple servers and client computers exchange data across the Internet.

FIG. 1 illustrates an exemplary network environment 100 in which multiple servers (e.g., web servers) and multiple client computers exchange data across the Internet 104. Although the examples discussed herein utilize the Internet to exchange data, the teachings of the present invention can be applied to any network environment. Portions of a network may include a public or private local area network (LAN) and/or a wide area network (WAN). Any number of servers and client computers may be interconnected on a network. The network may utilize any network topology (or topologies) and may communicate data using any communication protocol (or protocols).

Multiple web servers 102, 106, 108, and 110 are coupled to the Internet 104 along with a client computer 112. Any of the web servers and client computers coupled to the Internet 104 can communicate with one another. Since the Internet 104 is a world wide computer network, web servers 102, 106, 108, and 110, and client computer 112 can be located anywhere in the world. A web server may contain any number of web pages associated with any number of web sites. For example, a single web server may store and distribute (in response to a user's request to view the page) web pages for several different companies or organizations.

Server 106 includes a search engine 114, which is capable of searching through various web pages and/or web directories accessible via the Internet 104 to locate web pages or web sites associated with a phrase or keyword provided by the user. A web directory is a list of web sites and/or web pages that have been reviewed and tagged with keywords or key phrases by one or more editors. Thus, the web directory information is typically more focused and the searching produces higher quality results. The particular entries in the web directory can be generated based on an analysis of historical search requests (i.e., analyzing the types of web pages that are requested by users) and anticipating the types of addresses and/or text strings that typical users are likely to enter and associating those entries with the user's desired result.

Individual web pages may have hundreds or thousands of words that are identified by a search engine. However, the words on the web page do not necessarily identify the significant topics associated with the web page.

Figure 3:
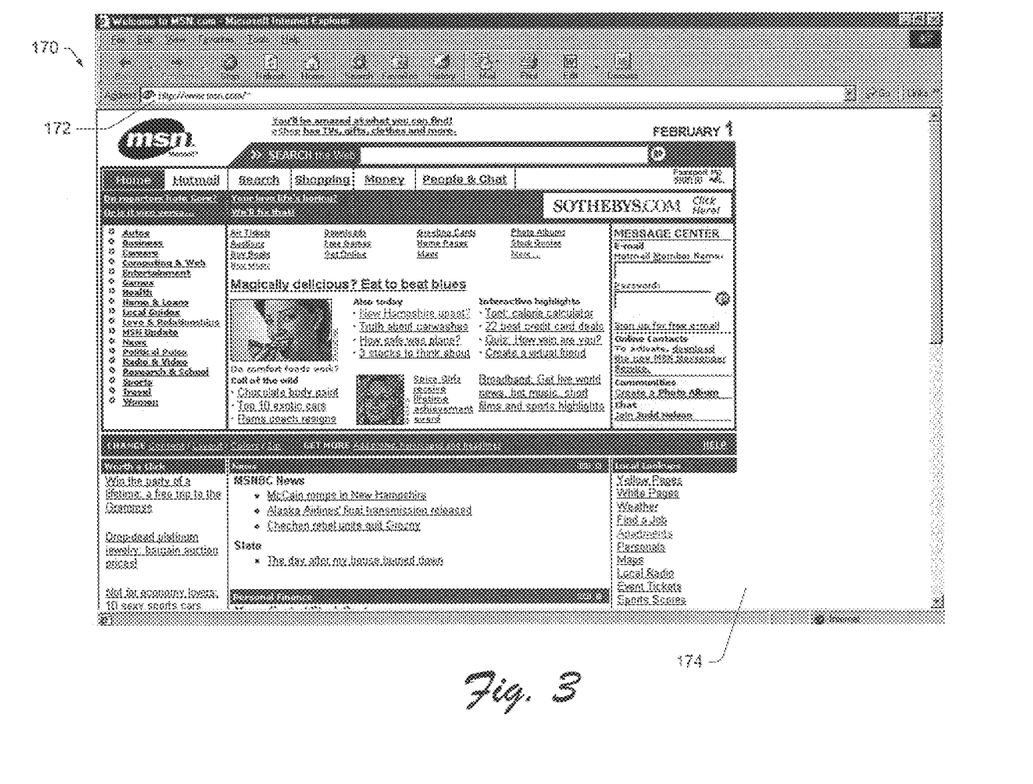
FIG. 3 illustrates an exemplary display generated by a web browser application.

Client computer 112 contains a web browser application 116. A browser application is used to locate and display web pages (e.g., both textual and graphical data) stored on one or more servers coupled to the Internet 104. An exemplary browser application 116 is Internet Explorer 5.0, manufactured and distributed by Microsoft Corporation of Redmond, Wash. An exemplary web browser user interface is shown in FIG. 3 and discussed below.

A particular web directory may contain thousands of entries. For example, a web page relating to a car manufacturer (Smith Motor Company) may have several entries in the web directory that will identify Smith Motor Company web page as a likely page of interest to the user entering the text string. If the user enters "Smith Motor", "Smith Cars", "Smith Trucks", "Smith Motor Cars", or "Smith Used Cars" as the text string, the text string will be converted to the Smith Motor Company home page (http://www.smithmotorcars.com). Additional entries may be provided for specific models of vehicles (such as "Smith 2000" or "Smith 2000 Wagon"), which correspond to a web page associated with the specific model. For example, text string "Smith 2000" correspond to a URL http://www.smithmotorcars.com/2000.htm.

The web directory may also contain entries that "redirect" a web page address entered as a text string to a different web page. Editors creating the web directory may be aware of certain web pages that do not contain information that a user would expect based on the web page address. For these pages, the editor of the web directory causes the browser to retrieve a different web page that is more likely to be the desired result. For example, a user may enter a text string in the web browser address box that corresponds to the name of a cartoon character. However, that web page is actually associated with content suited for adult viewing only. In this situation, the web directory entry for the text string entered by the user causes the web browser to retrieve a web page associated with the creator of the cartoon character rather than the adult-oriented page.

In an example Internet transaction, a user sends a request to access (or view) a particular web page by communicating the address of the web page to the server that contains the web page. In response to the user's request, the server returns a copy of the requested web page. The web browser application then displays the received web page on a display device (which is part of client computer 112). A particular web page may contain hyperlinks—links to other web pages that are activated by clicking on the hyperlink.

Figure 2:
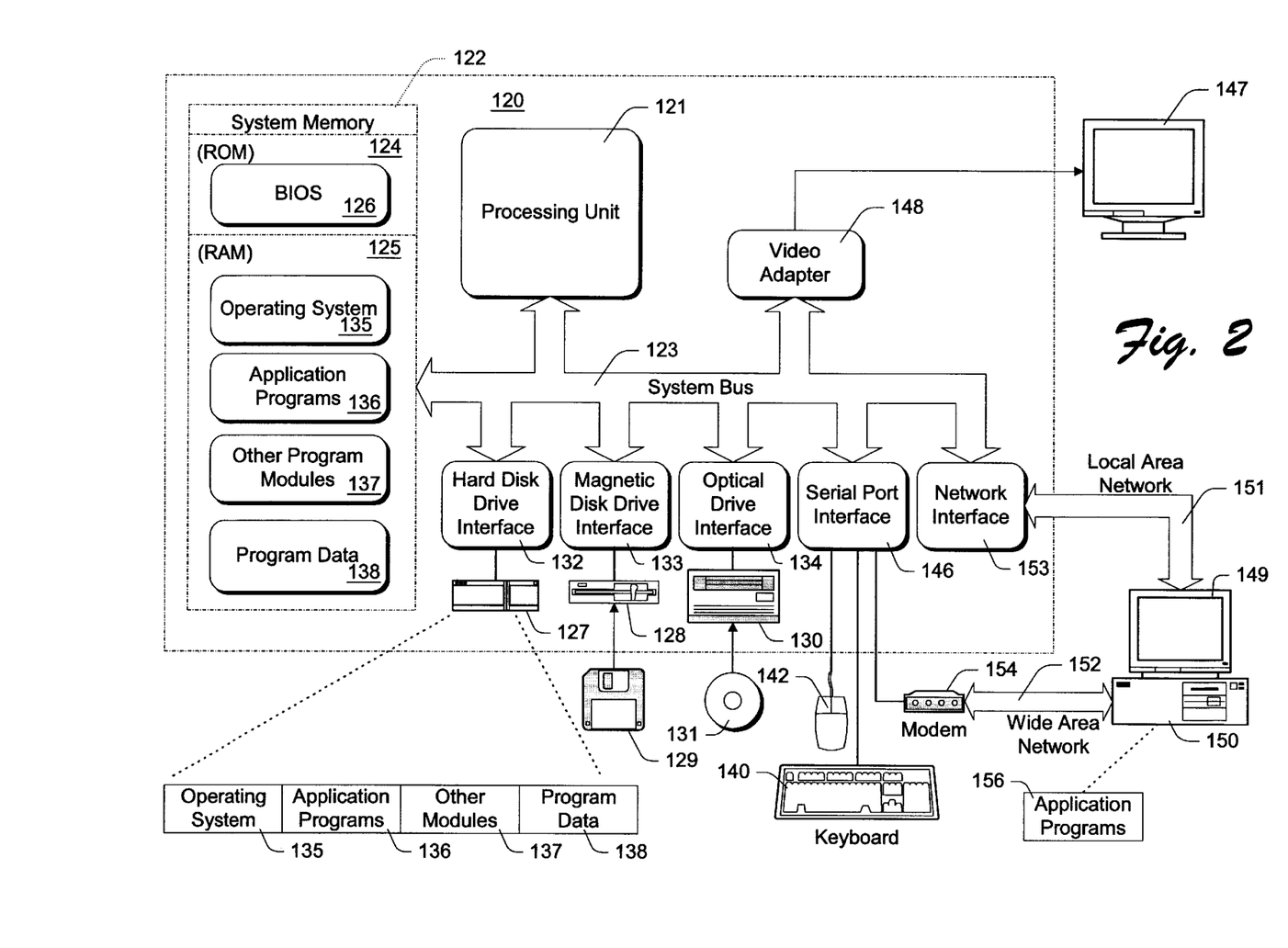
FIG. 2 is a block diagram showing pertinent components of a computer in accordance with the invention.

FIG. 2 is a block diagram showing pertinent components of a computer 120 in accordance with the invention. A computer such as that shown in FIG. 2 can be used, for example, to perform various procedures necessary to search for data in a network, such as searching for web pages and/or web sites on the Internet, as described herein. Servers 102, 106, 108, and 110, and client computer 112 may contain some or all of the components shown in FIG. 2.

Computer 120 includes one or more processors or processing units 121, a system memory 122, and a bus 123 that couples various system components including the system memory 122 to processors 121. The bus 123 represents one or more of any of several types of bus structures, including a memory bus or memory controller, a peripheral bus, an accelerated graphics port, and a processor or local bus using any of a variety of bus architectures. The system memory 122 includes read only memory (ROM) 124 and random access memory (RAM) 125. A basic input/output system (BIOS) 126, containing the basic routines that help to transfer information between elements within computer 120, such as during startup, is stored in ROM 124.

Computer 120 further includes a hard disk drive interface 132 coupled to system bus 123 and a hard disk drive 127. Hard disk drive 127 is for reading from and writing to a hard disk (not shown). A magnetic disk drive interface 133 is coupled to system bus 123 and a magnetic disk drive 128. Magnetic disk drive 128 is for reading from and writing to a removable magnetic disk 129. An optical drive interface 134 is coupled to system bus 123 and an optical disk drive 130. Optical disk drive 130 for reads from or writes to a removable optical disk 131 such as a CD ROM or other optical media. The drives and their associated computer-readable media provide nonvolatile storage of computer-readable instructions, data structures, program modules and other data for computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 127, magnetic disk 129, optical disk 131, ROM 124, or RAM 125, including an operating system 135, one or more application programs 136, other program modules 137, and program data 138. A user may enter commands and information into computer 120 through input devices such as a keyboard 140 and a pointing device 142. Other input devices (not shown) may include a microphone, joystick, game pad, satellite dish, scanner, or the like. These and other input devices are connected to the processing unit 121 through a serial port interface 146 that is coupled to the bus 123. A monitor 147 or other type of display device is also connected to the bus 123 via an interface, such as a video adapter 148. In addition to the monitor, personal computers typically include other peripheral output devices (not shown) such as speakers and printers.

Computer 120 commonly operates in a networked environment using logical connections to one or more remote computers, such as a remote computer 149. The remote computer 149 may be another personal computer, a server, a router, a network PC, a peer device or other common network node, and typically includes many or all of the elements described above relative to computer 120, although only a memory storage device 150 has been illustrated in FIG. 2. Remote computer 149 may include one or more application programs 156 stored in the memory storage device 150. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, computer 120 is connected to the local network 151 through a network interface or adapter 153. When used in a WAN networking environment, computer 120 typically includes a modem 154 or other means for establishing communications over the wide area network 152, such as the Internet. The modem 154, which may be internal or external, is connected to the bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Generally, the data processors of computer 120 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention can be implemented in hardware or a combination of hardware, software, and/or firmware. For example, one or more application specific integrated circuits (ASICs) could be programmed to carry out the invention.

FIG. 3 illustrates an exemplary display screen 170 generated by a web browser application. In this example, the display screen 170 was generated by Internet Explorer 5.0. Screen 170 includes an address box 172, which permits the user of the browser application to enter a web address (e.g., in the form of a URL) associated with a web page the viewer wants to access. Although a user may generally enter a URL in address box 172, as described herein, the user may enter any information in the address box and the browser will automatically search for an appropriate web page if the user-entered information does not identify a particular web page.

As shown in FIG. 3, a URL (http://www.msn.com) was entered in address box 172, which caused the associated web page to be displayed in a pane 174. A pane can be any portion of a screen or window that is capable of displaying information. A pane may also be referred to as a window or a sub-window.

Figure 4:
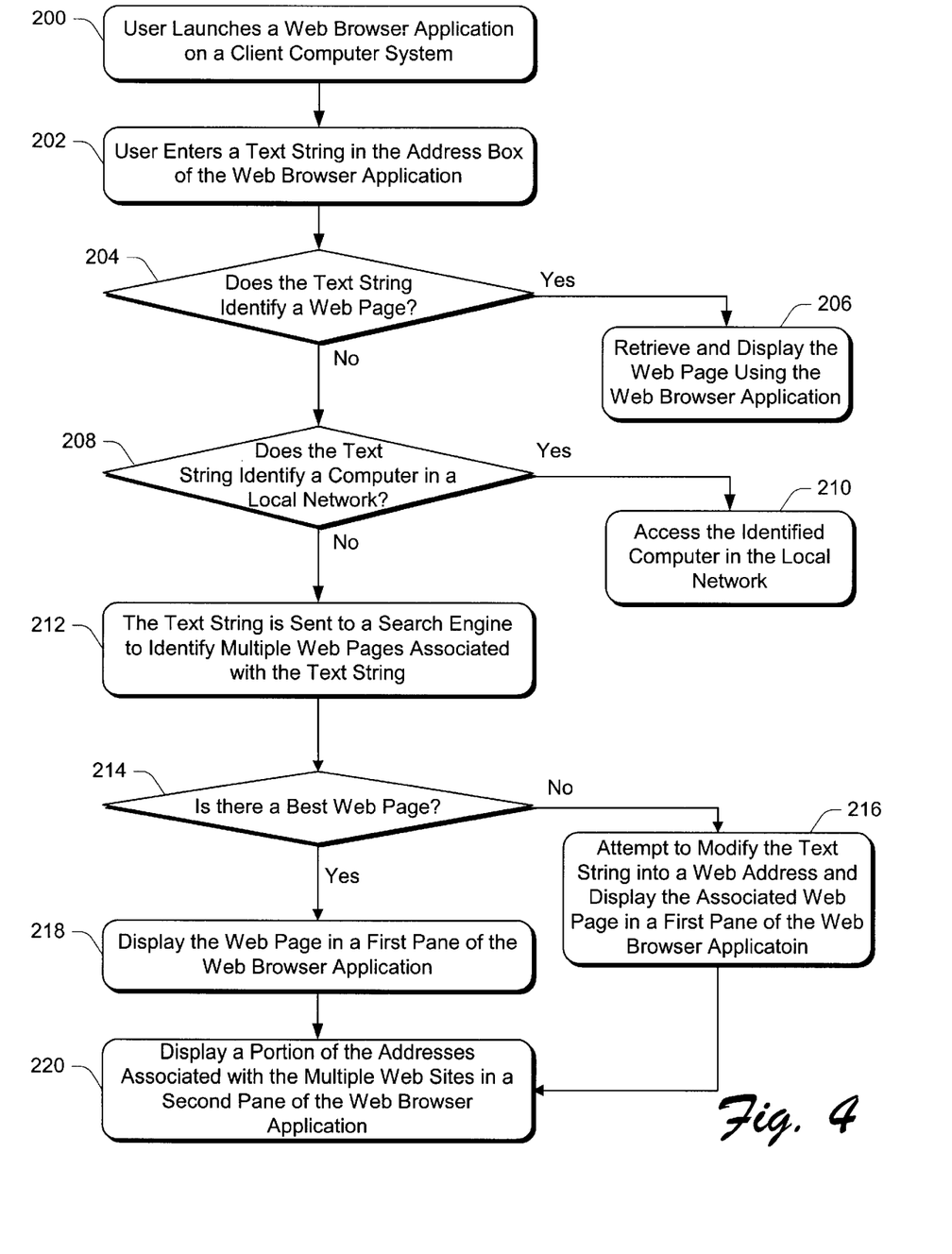
FIG. 4 illustrates a procedure for handling a text string entered in the address box of a web browser.

FIG. 4 illustrates a procedure for handling a text string entered in the address box of a web browser. Initially, a user launches a web browser application (block 200) on a client computer (such as client computer 112 in FIG. 1). The user enters a text string in the address box of the web browser application (block 202). The browser application begins processing the text string after the user presses the "Enter" key on the keyboard, clicks on the "Go" button to the right of the address box, or otherwise indicates that the text string is complete and ready for processing. The text string may contain any number of words, numbers, characters, punctuation or other data. The text string is not required to follow a particular format. Exemplary text strings include "acme brush", "www.acmebrush.com", "acme", "http://www.acme.com", and "acme brush dealer 12". The user may believe (correctly or not) that the text string represents a valid web page address.

After the user has entered the text string, the procedure determines whether the text string identifies a web page (block 204). For example, the procedure may determine that the text string identifies a web page if the text string begins with the characters "http:/H". Furthermore, the procedure may determine that the text string identifies a web page if the text string contains periods along with a particular prefix (e.g., "www") or a particular suffix (e.g., "com", "edu", or "org"). For example, the text string "acme.com" or "www.acmebrush" is considered to identify a web page. If the text string identifies a web page, then the identified web page is retrieved and displayed using the web browser application (block 206). The procedure may modify the text string as needed to create a valid URL. For example, the text string "www.acmebrush" would be modified to "http://www.acmebrush.com" (adding "http://" at the beginning and adding ".com" to the end of the text string), which represents a valid URL.

If the text string identifies a web page or the text string is modified to create a valid URL, the procedure may determine whether the URL is identified in the web directory, discussed above. If the URL is identified in the web directory, then the web directory may suggest an alternate network address that is associated with a web page that is more likely to correspond with what the user of the browser desires.

If the text string does not identify a web page, then the procedure determines whether the text string identifies a computer (or a server or other resource) in a local network (block 208). For example, the text string may represent the name of a server or other device on a LAN to which the user is connected. If the text string does identify a computer in a local network, then the procedure accesses the identified computer (or other resource) in the user's local network (block 210).

If the text string does not identify a computer in a local network, then the text string is sent to a search engine (e.g., search engine 114 in FIG. 1) to identify multiple web pages associated with the text string (block 212). The search engine is typically located on a web server (e.g., server 106 in FIG. 1). Thus, the web browser identifies an appropriate search engine to perform the search and forwards the search information (i.e., the text string entered by the user) to that search engine. The choice of search engines may be configured by the user of the browser application, as discussed below. The search engine returns a list of search results to the browser application.

Next, the procedure determines whether a "best" web page was located by the search engine (block 214). The "best" web page may also be referred to as the "top pick". The "best" web page is the one that is most likely the web page the user expected to access. If a "best" web page cannot be located, the procedure attempts to modify the text string into a web address and display the associated web page in a first pane of the web browser application (block 216). If the text string cannot be modified to generate a web address, then a message is displayed in the first pane of the web browser indicating that the browser application could not find any web address matches for the query.

If a best web page was located by the search engine, then the best web page is displayed in the first pane of the web browser application (block 218). Finally, the procedure displays a portion of the addresses associated with the multiple web sites identified by the search engine in a second pane of the web browser application (block 220). The "portion" of the addresses displayed is defined by the space available in the second pane to display addresses. For example, a particular pane may be capable of displaying ten addresses.

Figure 5:
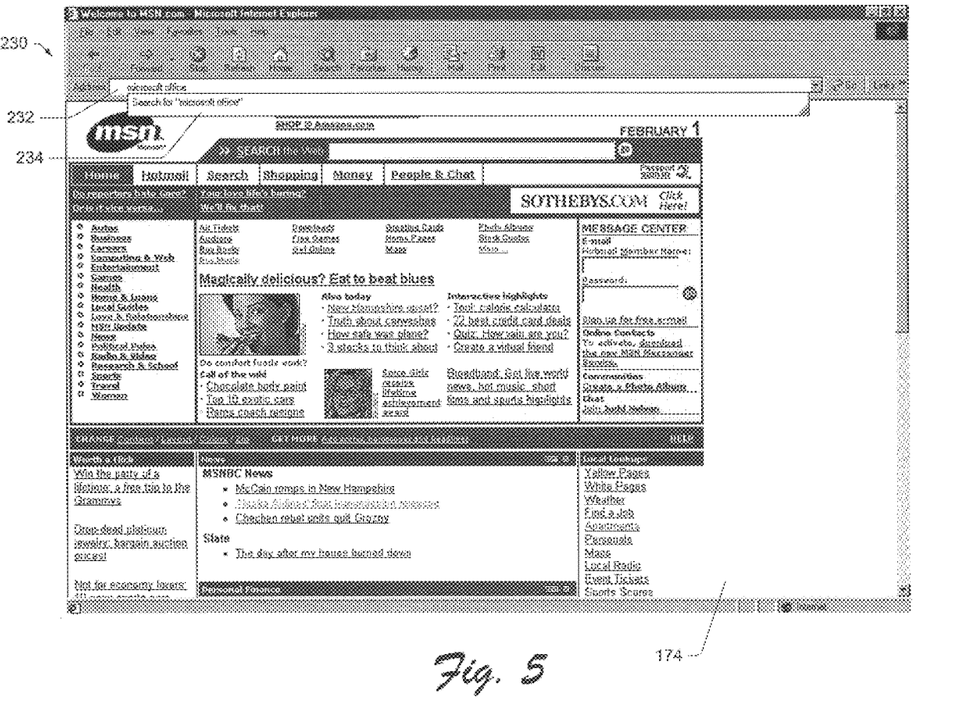
FIGS. 5 and 6 illustrate an exemplary displays generated by a web browser.
Figure 6:
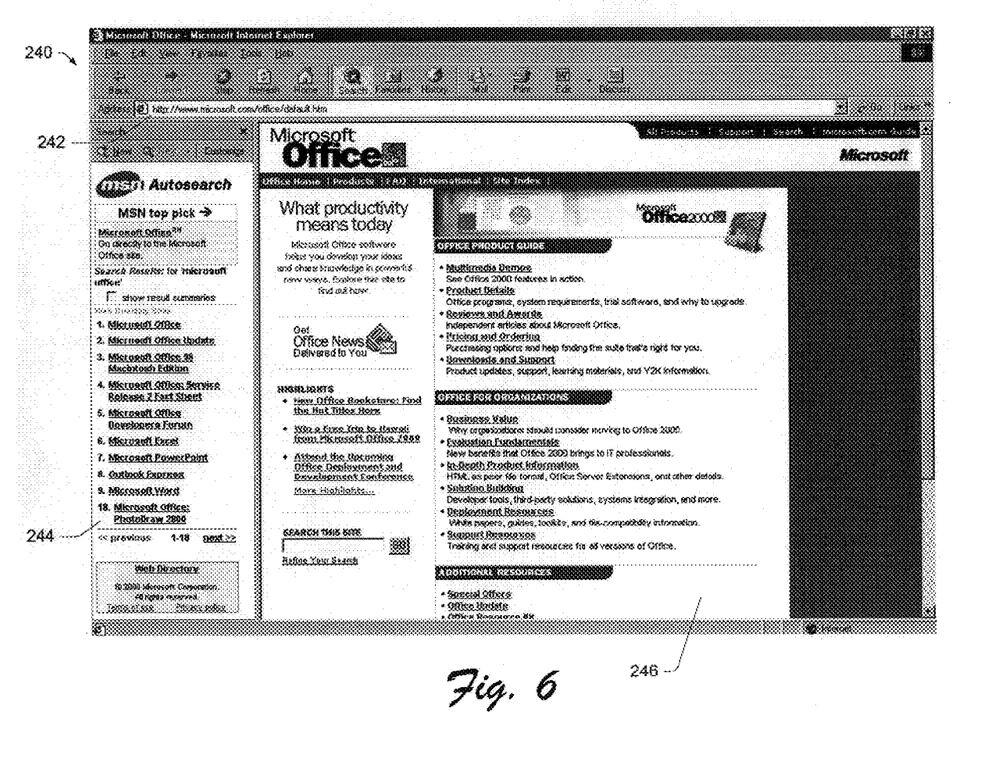

The procedure described above with respect to FIG. 4 will be illustrated using example web browser screens shown in FIGS. 5 and 6. In FIG. 5, a browser screen 230 includes an address box 232 and a temporary box 234 located below (and partially overlapping) the address box 232. In the example of FIG. 5, the user has entered a text string "microsoft office" in the address box 232. The procedure determines that this text string does not identify a web page because the string has no periods and does not begin with "http://". The procedure also determines that the text string does not identify a computer (or other resource) on the user's local network. Thus, the text string is sent to a search engine to identify web pages associated with the text string.

FIG. 6 illustrates an example web browser screen 240 after the search engine has returned the search results. An address box 242 indicates the URL of the "best" web page (i.e., the web page selected by the browser or the search engine as the most likely to be of interest to the user based on the text string). The "best" web page is automatically retrieved and displayed in a first pane 246. In this example, the Microsoft Office web page is displayed automatically in response to the text string. Thus, the user is not required to remember or attempt to locate the correct URL for the Microsoft Office web page. Merely entering the text string "microsoft office" in the address box results in the automatic selection of a "best" web page. This automatic identification of web pages and the selection of a "best" web page increases the likelihood that the user locates the desired web site. The automatic identification of web pages also reduces the frustration to a user who doesn't remember or cannot find the exact URL of the desired web page or web site. Additionally, the mere entry of a text string automatically causes the identification of a best web page and multiple alternative web pages that may be of interest to the user. This is an improvement over systems that require entry of complete (or substantially complete) URLs and, if the URL is not correct, require a separate entry of similar search term keywords in a separate search box.

A second pane 244 is created as part of screen 240 to display at least a portion of the addresses identified by the search engine. In the example of FIG. 6, pane 244 is capable of listing ten addresses (numbered 1–10) simultaneously. To view additional search results, the user clicks on the "next >>" indicator. To view previous search results, the user clicks on the "<<previous" indicator. To select a particular web address from the list, the user clicks on the desired web address, which causes the web browser to retrieve and display the associated web page in the first pane 246, thereby removing the previously displayed web page from the first pane 246.

In a particular embodiment, when the search engine is invoked, the engine first searches through a web directory for web pages related to the text string. Next, the search engine searches for additional web pages using a web page search. The web directory search is likely to generate better results because the keywords in the web directory are entered by editors who review the web pages rather than merely searching for the existence of words (i.e., the words in the text string) in a web page.

In another embodiment, the search engine searches only the web directory and does not perform a web page search. This approach saves time and resources by not performing a web page search, which often produces lower quality results.

Figure 7:
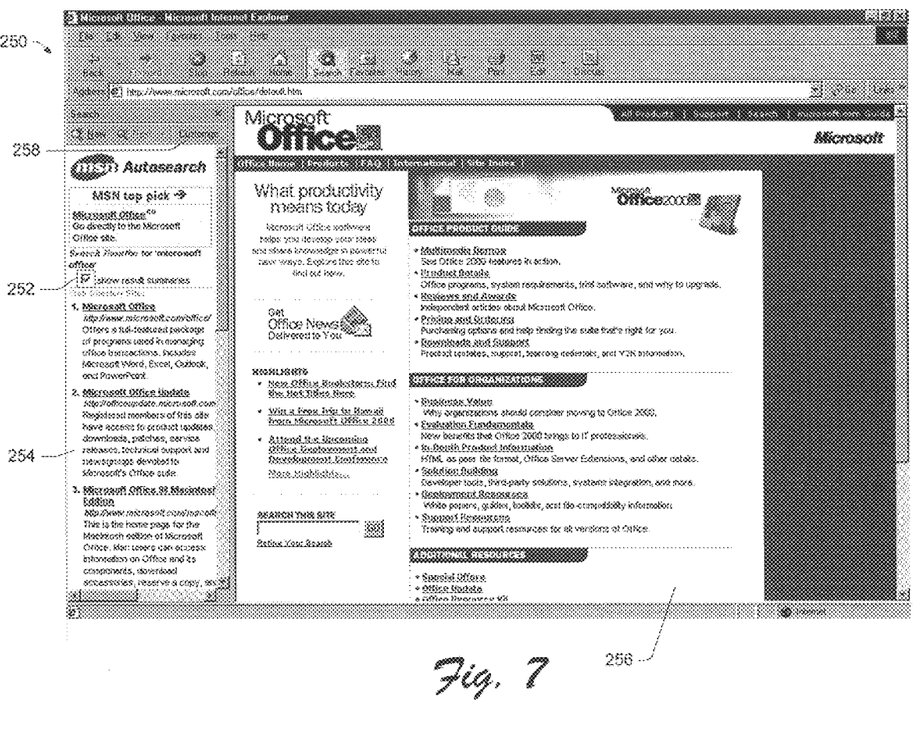
FIG. 7 illustrates an example web browser screen with a summary provided for each result listed.

FIG. 7 illustrates an example web browser screen 250 with a summary provided for each address listed in pane 254. The summary is provided as a result of checking box 252, labeled "show result summaries". The "best" web site continues to be displayed in a large pane 256. A "customize" button 258 allows the user of the browser application to customize certain features of the browser application.

Figure 8:
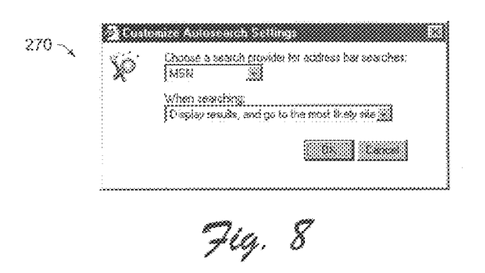
FIGS. 8, 9, and 10 illustrate various states of a dialog box that allows the user to customize the automatic search features.
Figure 9:
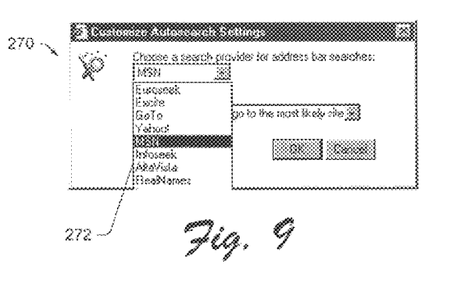
Figure 10:
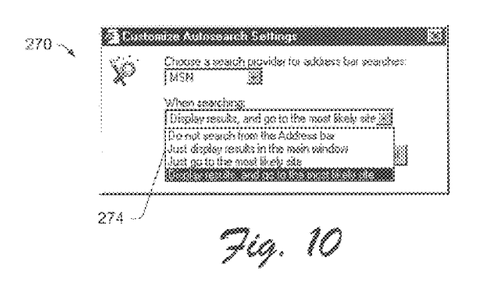

Clicking the customize button 258 (FIG. 7), generates a dialog box of the type shown in FIG. 8. FIGS. 8, 9, and 10 illustrate various states of a dialog box that allows the user to customize certain automatic search features. In FIG. 8, a dialog box 270 allows the user to select a search provider (e.g., search engine) for address box searches and select the manner in which the automatic searching is performed. FIG. 9 illustrates dialog box 270 with a drop-down box 272 listing various choices to select as a search provider for address box searches. Similarly, FIG. 10 illustrates dialog box 270 with a drop-down box 274 that lists different options for performing automatic searches. For example, the user can choose to only display search results (i.e., web page addresses) in the main window, which eliminates the selection and display of a "best" web page. The highlighted entry in box 274 ("Display results, and go to the most likely site") corresponds to the procedure discussed above with respect to FIG. 4.

Thus, a system and method has been described that automatically identifies multiple web pages associated with a text string entered in an address box of a web browser if the text string does not identify a web page. A list of identified web pages are displayed in a first pane and a "best" web site is retrieved and displayed in a second pane of a web browser screen.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:
    receiving a text string in an address entry portion of a web browser, wherein the text string does not identify a web page;
    identifying a plurality of web pages associated with the text string by using a search engine, the choice of search engine selectable by a user, each web page having an associated address;
    selecting a best web page from the plurality of web pages associated with the text string;
    displaying the best web page in a first pane; and
    displaying at least a portion of the addresses associated with the plurality of web pages in a second pane.

2. A method as recited in claim 1 wherein the best web page is selected from a web directory search.

3. A method as recited in claim 1 wherein the best web page is selected from a web page search.

4. A method as recited in claim 1 wherein the best web page is selected from the combined results of a web directory search and a web page search.

5. A method as recited in claim 1 wherein the text string is a single word.

6. A method as recited in claim 1 wherein the text string is multiple words.

7. One or more computer-readable memories containing a computer program that is executable by a processor to perform the method recited in claim 1.

8. A method comprising:
    receiving a text string in an address entry portion of a web browser, wherein the text string does not identify a web page;
    identifying a plurality of web pages associated with the text string, each web page having an associated address;
    selecting a best web page from the plurality of web pages associated with the text string;
    displaying the best web page in a first pane, wherein the displaying of the best web page can be disabled by a user; and
    displaying at least a portion of the addresses associated with the plurality of web pages in a second pane.

9. A method comprising:
    receiving a text string in an address entry portion of a web browser, wherein the text string does not identify a web page;
    identifying a plurality of web pages associated with the text string, each web page having an associated address;
    selecting a best web page from the plurality of web pages associated with the text string;
    displaying the best web page in a first pane; and
    displaying at least a portion of the addresses associated with the plurality of web pages in a second pane; wherein the first pane is significantly larger than the second pane.

10. A method as recited in claim 9 wherein the second pane provides navigation buttons for navigating through the plurality of web page addresses.

11. A method as recited in claim 9 further comprising:
    receiving a request to display a web page associated with an address displayed in the second pane; and
    displaying the requested web page in the first pane.

12. A method as recited in claim 11 wherein the web page previously displayed in the first pane is replaced by the requested web page.

13. A method comprising:
    reading a text string from a data entry location of a resource locator;
    determining whether the text string identifies a particular resource;
    if the text string identifies a particular resource, then retrieving the identified resource;
    if the text string does not identify a resource,
        identifying a plurality of resources associated with the text string, wherein identifying a plurality of resources is performed by a search engine, the choice of search engine selectable by a user;
    identifying a best resource from the plurality of resources associated with the text string;
    displaying the best resource in a first pane; and
    displaying at least a portion of the other resources in a second pane.

14. A method as recited in claim 13 further comprising determining whether the text string identifies a resource on a local network.

15. A method as recited in claim 13 further comprising attempting to modify the text string to identify a resource if the text string does not already identify a resource.

16. A method as recited in claim 13 wherein the best resource is selected from a resource directory search.

17. A method as recited in claim 13 wherein the resource locator is a web browser.

18. A method as recited in claim 13 wherein the text string is multiple words.

19. A method as recited in claim 13 further comprising:
    receiving a request to access a resource displayed in the second pane; and
    displaying the requested resource in the first pane.

20. One or more computer-readable memories containing a computer program that is executable by a processor to perform the method recited in claim 13.

21. A method comprising:
    reading a text string from a data entry location of a resource locator;
    determining whether the text string identifies a particular resource;
    if the text string identifies a particular resource, then retrieving the identified resource;
    if the text string does not identify a resource,
        identifying a plurality of resources associated with the text string;
    identifying a best resource from the plurality of resources associated with the text string;

displaying the best resource in a first pane, wherein displaying the best resource can be disabled by a user; and displaying at least a portion of the other resources in a second pane.

22. One or more computer-readable media having stored thereon a computer program that, when executed by one or more processors, causes the one or more processors to:

receive a text string in an address entry location of a web browser, wherein the text string does not identify a web page;

identify through a user selected search engine, a plurality of web pages associated with the text string, each web page having an associated address;

select and display a best web page from the plurality of web pages associated with the text string; and display at least a portion of the addresses associated with the plurality of web pages in a second pane.

23. One or more computer-readable media as recited in claim 22 wherein the best web page is selected from a web directory search.

24. One or more computer-readable media as recited in claim 22 wherein the text string is at least one word in length.

25. One or more computer-readable media as recited in claim 22 wherein the text string is modified to identify a web page if the text string does not already identify a web page.

26. A graphical user interface for an automatic searching method and system, the graphical user interface comprising:

an address box to enable a user to input a text string;

a first pane to display a best web page identified from a plurality of web pages associated with the text string; and a second pane to display at least a portion of the addresses associated with the plurality of web pages associated with the text string, wherein the first pane is significantly larger than the second pane.

27. A graphical user interface as recited in claim 26 wherein the best web page is selected from a web directory search.

28. A graphical user interface as recited in claim 26 wherein the text string does not identify a web page.

29. A method for displaying automatic search results, comprising the following steps:

presenting an address box in a graphical user interface, the address box to receive data entered by a user;

presenting a first pane in the graphical user interface, the first pane being associated with a web page selected and retrieved based on the data entered by the user;

presenting a second pane in the graphical user interface, the second pane being associated with a list of web page addresses associated with the data entered by the user, wherein the first pane is significantly larger than the second pane; and enabling a user to select one of the web page addresses listed in the second pane, wherein the web page associated with the selected address is retrieved and displayed in the second pane.

30. A method as recited in claim 29 further including providing navigation buttons in the second pane to navigate through the list of web page addresses.

31. A method for displaying automatic search results, comprising the following steps:

presenting an address box in a graphical user interface, the address box to receive data entered by a user;

presenting a first pane in the graphical user interface, the first pane being associated with a web page selected and retrieved based on the data entered by the user;

presenting a second pane in the graphical user interface, the second pane being associated with a list of web page addresses associated with the data entered by the user;

enabling a user to select one of the web page addresses listed in the second pane, wherein the web page associated with the selected address is retrieved and displayed in the second pane; and providing a customization button to allow a user to customize the appearance of the graphical user interface.

32. A method as recited in claim 31 wherein the customization button allows the user to disable the display of the first pane.

\* \* \* \* \*